United States Patent [19]

Amemori et al.

[11] 4,294,123
[45] Oct. 13, 1981

[54] TURBINE METER

[75] Inventors: Hiroyuki Amemori; Masao Yamada, both of Kawasaki, Japan

[73] Assignee: Tokico Ltd., Kawasaki, Japan

[21] Appl. No.: 96,186

[22] Filed: Nov. 20, 1979

[30] Foreign Application Priority Data

Nov. 22, 1978 [JP] Japan .................................. 53-144885

[51] Int. Cl.³ ............................................. G01F 1/115
[52] U.S. Cl. ................................................. 73/861.92
[58] Field of Search ..................... 73/861.91, 861.92; 415/110–112; 308/9

[56] References Cited

U.S. PATENT DOCUMENTS 3,097,529 7/1963 Jackson et al. ................... 73/861.91
3,121,330 2/1964 Leslie et al. ...................... 73/861.92
4,111,046 9/1978 Amemori et al. ................. 73/861.91

Primary Examiner—James J. Gill
Attorney, Agent, or Firm—Haseltine and Lake

[57] ABSTRACT

A turbine meter comprises an axle member supported by a support member within a conduit through which a fluid to be measured is passed and having a small-diameter axle part and an annular recess formed around the small-diameter axle part between a pair of opposed faces, a longitudinal flow passage formed in the axle member, a plurality of discharge holes formed in the axle member to connect communicatively the annular recess and the flow passage, a supply pipe inserted into the conduit through the wall thereof and functioning to supply a pressurized fluid from a pressurized fluid source disposed outside of the conduit to the flow passage in the axle member, a vane wheel comprising a hub disposed around the axle member and within the annular recess with minute gaps therebetween and adapted to rotate in a substantially non-contacting state relative to the small-diameter axle part and a plurality of vanes implantedly fixed at their root parts to the hub, the vane wheel being rotated by a portion of the fluid to be measured and flowing through the conduit, and a discharge passage one end thereof opening at least one of the pair of opposed faces so as to connect the annular recess and the other end thereof opening into the conduit at a position separated from the vanes of the vane wheel. The pressurized fluid passing from the discharge holes into the annular recess is discharged by way of the discharge passage into the conduit at a position separated from the vanes.

5 Claims, 6 Drawing Figures

TURBINE METER

BACKGROUND OF THE INVENTION

The present invention relates generally to turbine meters, and more particularly to improvements in a turbine meter in which a pressure-fed fluid bearing is used in the shaft bearing of its vane wheel or rotor, and which is highly suitable for measurements of flow velocities or flow rates particularly of gases and the like having no lubricative property.

In general, turbine meters are used for measuring flow velocities, flow rates, and other quantities of fluids flowing in pipes and ducts of large inner diameter such as smoke stacks and flues.

In a conventional turbine meter of this type, a ball bearing or a sleeve bearing is used for the bearing supporting the shaft of the vane wheel or rotor which is rotated by the flow of a fluid.

However, while ball bearings have the advantage of relatively low rotational resistance, they have the drawback of poor durability. Particularly in cases such as that where a mechanism for supplying lubricating oil to the bearing cannot be installed because of miniaturization of the turbine meter, itself, or that where the fluid to be measured is a high-temperature or low-temperature gas and there is no suitable lubricating oil which can be used, the ball bearing must rotate in an unlubricated state. For this reason, ball bearings under such conditions have extremely short serviceable lives.

Sleeve bearings have the advantage of better durability than ball bearing but have the disadvantage of high rotational resistance. For this reason, the measurement accuracy of a turbine meter using a sleeve bearing becomes poor in instances of measurement of gases of low density which cannot exert ample torque on the vane wheel. The measurement accuracy is especially impaired in the low flow rate range. Furthermore, in the measurement of a gas, damage such as seizure, galling, and scoring easily occur in the sleeve bearing since the gas does not have lubricative property.

Still another problem accompanying both ball bearings and sleeve bearings, when used in a turbine meter, is that when foreign matter such as dirt, dust, and slurry are in a mixed state within the fluid being measured, these foreign substances readily infiltrate into the bearing and give rise to a variation in the rotational resistance, whereby the measurement accuracy drops, and the instrument error characteristic deteriorates. Furthermore, the friction in the bearing increases, and the serviceable life of the bearing thereby becomes short, whereby stable measurement over a long period becomes difficult.

Accordingly, for the purpose of solving the above described problems, turbine meters in which so-called pressure-fed fluid bearings are used for rotatably supporting the vane wheel have been developed. These known turbine meters are of so-called in-line type of a construction wherein an outer cowling or casing of the same inner diameter as the pipe line or conduit conducting the fluid to be measured is provided, and a large-diameter vane wheel for rotating within this outer casing is rotatably supported on a pressure-fed fluid bearing. In the case where the pipe line conducting the fluid to be measured is of large diameter, however, the structure of the pressure-fed fluid bearing of this in-line type turbine meter is large, and consequently the quantity of fluid discharged therefrom and becoming mixed with the fluid being measured is not negligible and greatly impairs the accuracy of measurement.

Furthermore, this kind of pressure-fed fluid bearing is generally of a construction in which the fluid for the bearing is discharged radially into the flow passage of the fluid to be measured through a gap formed between the rear end surface of the hub of the vane wheel and a supporting member opposite thereto. The fluid is thus discharged in disc-shaped curtains in planes confronting and parallel to the planes of the leading and trailing edges of the vanes of the vane wheel. Therefore, particularly at low flow rates, the fluid to be measured is retarded and prevented from smoothly passing between the adjacent vanes by the disc-shaped curtains of discharged fluid and this causes a drop in the flow rate detection sensitivity of the vane wheel.

SUMMARY OF THE INVENTION

Accordingly, it is a general object of the present invention to provide a novel and useful turbine meter in which the above described problems have been solved.

Another specific object of the invention is to provide a turbine meter in which the fluid for the pressure-fed fluid bearing is discharged into a flow passage at a position displaced from the planes of the edges of the vanes of the vane wheel by a prescribed distance in the axial direction of the rotary axis of the vane wheel. According to the turbine meter of the present invention, it becomes possible to eliminate the above-mentioned difficulty involved in the prior turbine meter, namely the difficulty that disc-shaped curtains of bearing fluid formed in front and behind the vane wheel hinder the flow of the fluid to be measured between the vanes and thus cause a drop in the flow rate detection sensitivity of the vane wheel. Therefore, it becomes possible to obtain full benefit from the capability of a pressure-fed fluid bearing to permit enlargement of the measurable flow rate area in the low flow rate range.

Still another object of the invention is to provide a turbine meter in which a deflection plate is provided at an opening of the flow passage for discharging fluid from the pressure-fed fluid bearing, which opening confronts the fluid passage of fluid being measured. By this provision of this discharge plate in the turbine meter of the present invention, the fluid from the bearing can be discharged at a location far separated from the vane wheel, thus making it possible to accomplish the above described effect more satisfactorily and positively.

Other objects and further features of the invention will be apparent from the following detailed description with respect to preferred embodiments of the invention when read in conjunction with the accompanying drawings.

DETAILED DESCRIPTION

Figure 1:
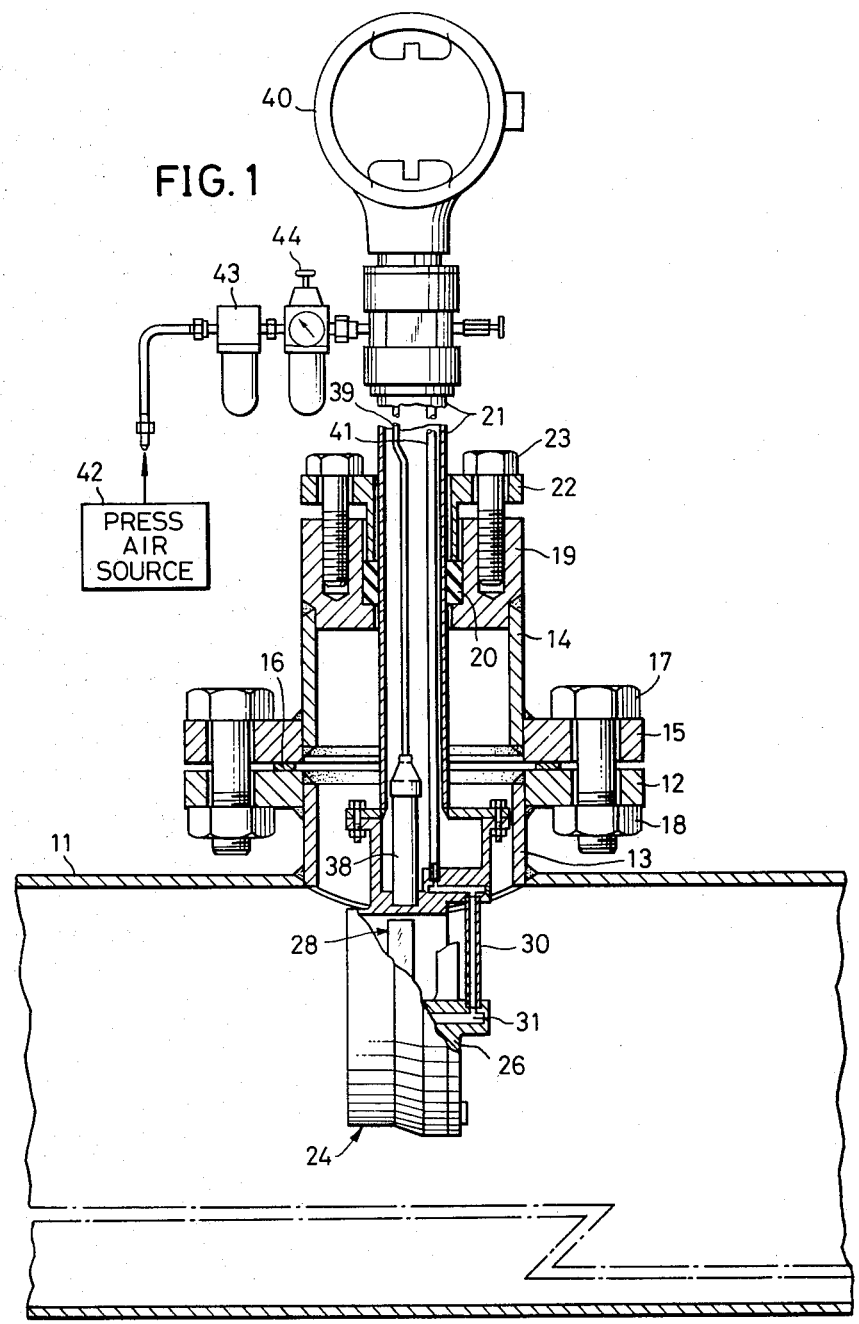
FIG. 1 is a side view, with parts cut away and parts shown in longitudinal section, showing one embodiment of a turbine meter according to the present invention in installed state.
Figure 2:
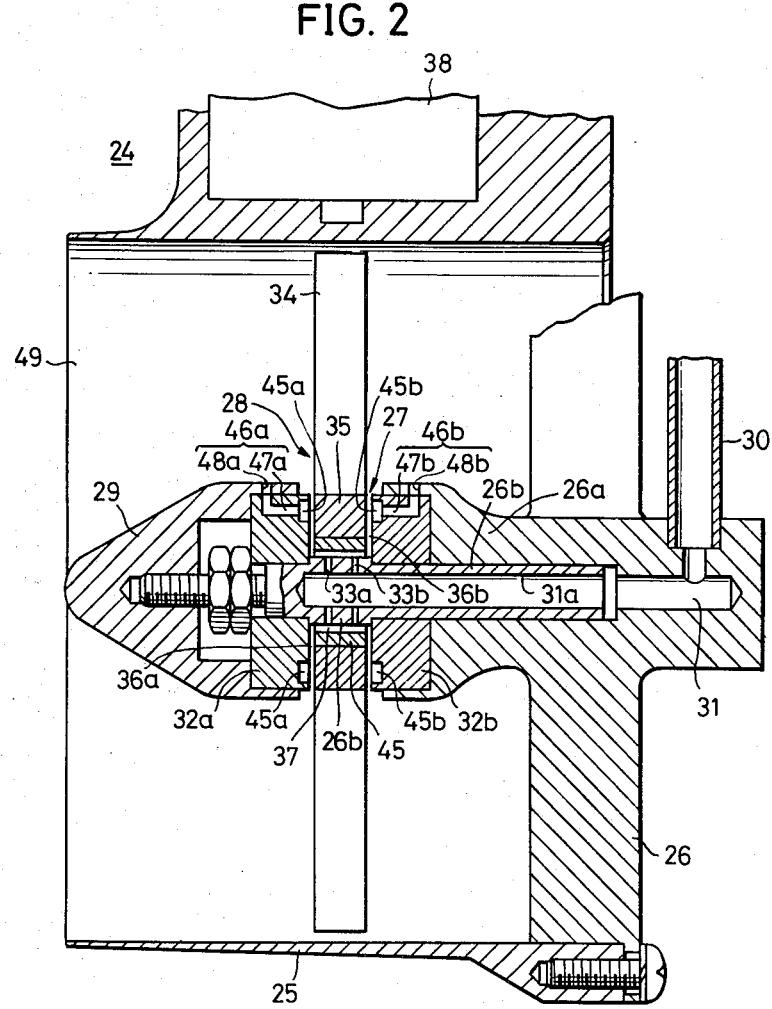
FIG. 2 is an enlarged side view in longitudinal section showing an essential part of a first embodiment of a pressure-fed fluid bearing for the turbine meter shown in FIG. 1.

Referring first to FIGS. 1 and 2, one embodiment of the invention will be described. This turbine meter is installed on a pipe line 11 of large inner diameter through which a fluid to be measured is flowing from left to right as viewed in the figures. Although the fluid to be measured is smoke (air) in the case where the pipe 11 is a smoke flue, for example, the turbine meter of the invention is applicable also to measurement of other gases and fluids. A hole is drilled in one position in the wall of the pipe 11, and a tubular projecting fitting 13 having a flange 12 fixed to it outer end is secured at its base end by a method such as welding to the pipe 11 at the rim of the hole. A flange 15 fixed to the base end of a support cylinder 14 is secured by bolts 17 and nuts 18 to the flange 12 over a packing 16 interposed therebetween, the connection between the flanges 15 and 12 thereby being gas and liquid tight.

A boss 19 fixed coaxially to the outer end of the support cylinder 14 has a central through-hole through which a cylindrical turbine meter support structure 21 is inserted. A packing 20 is interposed between the boss 19 and the support structure 21 for a gas and liquid-tight fit therebetween and is held at the bottom of a counterbored hole in the boss 19 by a packing retainer 22. The support structure 21 is passed also through this packing retainer 22, which is forced toward the boss 19, and therefore against the packing 20, by bolts 23. A turbine assembly 24 is mounted on the lower end (or inner end) of the support structure 21 and projects downward from the lower end of the above described fitting 13 into the interior of the pipe 11.

The turbine assembly 24 comprises essentially an outer casing 25, support arms 26 fixed to the casing 25, a rear cone 26a projected forward and formed integrally with the support arms 26 and thus supported coaxially within the casing 25, a small-diameter axle part 26b projected forward from the front (or upstream) end of the rear cone 26a, an annular recess 27 formed around the axle part 26b, a vane wheel 28 rotatably supported on the axle part 26b in the recess 27, and a nose cone 29 secured to the front end of the axle part 26b. In this turbine assembly, a pressure-fed fluid bearing is formed between the hub 35 of vane wheel 28 and the annular recess 27 of the axle part 26b.

A gas passage 31 communicating with the downstream end of a gas supply pipe 30 described hereinafter is formed centrally through the rear cone 26a and communicates at its front end with a gas passage 31a formed centrally through the axle part 26b. A pair of annular thrust bearings 32a and 32b are fixed coaxially to the axle part 26b with a specific spacing therebetween at positions on the front and rear sides of the hub 35 of the vane wheel 28. A plurality of gas discharge holes 33a and 33b of small diameter are formed in and through the axle part 26b at positions between the opposed inner faces of the thrust bearings 32a and 32b. These discharge holes 33a and 33b provides communication between the gas passage 31a and the annular recess 27, and lie in respective spaced-apart parallel circles around the axis of the axle part 26b and are respectively spaced at equal angular intervals around their respective circles.

The vane wheel 28 comprises the above mentioned hub 35 of an inner bore diameter greater than the outer diameter of the axle part 26b and a front-to-rear axial dimension slightly less than the spacing between the opposed inner faces of the thrust bearings 32a and 32b and a plurality of blades or vanes 34 made of magnetic material and fixed to the hub 35 at angularly equally spaced positions therearound. Depending on the necessity, a bush 45 is provided to form the inner surface of the hub 35. By this construction, thin annular gaps 36a and 36b for discharging gas are formed respectively between the hub 35 and the bush 45 and the thrust bearings 32a and 32b, and a thin cylindrical space 37 for discharging gas is formed between the bush 45 and the axle part 26b.

In a position to confront the outer tips of the vanes 34 of the vane wheel 28, a pickup coil 38 is mounted on and partly embedded in the upper part of the casing 25. This pickup coil 38 is connected through conductor wires 39 extending through the interior of the support structure 21 to a preamplifier within an electric circuit container 40. The pickup coil 38 may be in the form of an electromagnetic pickup coil generating induced electromotive force in response to the rotation of the vane wheel 28, or it may be of the form of a high-frequency oscillation coil. In the latter case, a high-frequency signal modulated in response to the rotation of the vane wheel 28 is derived from the high-frequency oscillation coil and is detected, amplified, and shaped in the circuit system, whereby a pulse signal representing the rotational velocity of the vane wheel 28 is obtained and counted.

The aforementioned gas supply pipe 30 communicates at its other end with the downstream end of a gas supply pipe 41 extending through the interior of the support structure 21. The gas supply pipe 41 is supplied from the outside with pressurized air from a pressurized air source 42 through a filter 43 and a pressure-reducing valve 44.

In the turbine meter of the above described construction, pressurized air from the pressurized air source 42 is cleaned in the filter 43 and regulated in the pressure-reducing valve 44 to a suitable pressure higher than the pressure of the fluid being measured and is thereafter supplied through the gas supply pipe 41. The pressurized air thus supplied through the gas supply pipe 41 passes through the supply pipe 30, the passages 31 and 31a and is ejected through the discharge holes 33a and 33b into the discharge gap 37. The air thus discharged passes through the gap 37 and the discharge gaps 36a and 36b. In the design and operation of this turbine meter, the delivery pressure of the pressurized air source 42, the preset pressure of the pressure-reducing valve 44, the inner diameter and other dimensions of the bush 45, the dimensions of the hub 35, the bore diameter and number of the discharge holes 33a and 33b, the dimensions of the discharge gaps 36a, 36b, and 37, and other pertinent quantities are so determined that the resulting buoyant force due to the discharge air force in the gaps will be amply greater than the weight of the vane wheel 28.

Next a description is given of a discharge flow passage constituting an essential part of the present invention.

Annular grooves 45a and 45b are respectively cut into the inner faces of the thrust bearings 32a and 32b near the outer periphery thereof. Each of these inner faces opposes one lateral face of the hub 35. Discharge passages 46a and 46b in the thrust bearings 32a and 32b respectively provide communication between a part of the annular grooves 45a and 45b and the flow passage of the fluid being measured around the cones 29 and 26a.

These discharge passages 46a and 46b are constituted of L-shaped holes 47a and 47b and holes 48a and 48b. The L-shaped holes 47a and 47b are formed through the thrust bearings 32a and 32b and extend from the annular grooves 45a and 45b over a specific length in parallel with the rotational axis of the vane wheel 28. The holes 47a and 47b are respectively formed in the flange parts of the cones 29 and 26a which extend over and cover the thrust bearings 32a and 32b and communicate with the holes 47a and 47b which open at the outer periphery of the flange parts. By this arrangement, the discharge passages 46a and 46b are permitted to open at positions separated by desired distances forward and rearward from the front and rear edges of the vanes 34 of the vane wheel 28.

The discharge gaps 36a and 36b formed by the clearance between the thrust bearings 32a and 32b and the opposite faces of the hub 35 are made narrow so as to provide large fluid resistance against the air discharged from the discharge holes 33a and 33b. On the other hand, in the region of the annular grooves 45a and 45b, the discharge gaps become large and offer very small fluid resistance against the air. Furthermore, the diameter of the discharge passages 46a and 46b are made relatively large compared with the width of the gaps 36a and 36b. The discharge passages 46a and 46b thus offer very small fluid resistance.

According to this construction, the greater part of the air for providing bearing effect which is discharged from the discharge holes 33a and 33b into the gaps 36a and 36b flows into the annular grooves 45a and 45b near the outer peripheral part of the gaps 36a and 36b, and the air discharged from the outermost peripheral part of the gaps 36a and 36b is limited to a very small quantity. The air which passes into the grooves 45a and 45b flows through the discharge passages 46a and 46b and is then discharged into the flow passage 49 of fluid to be measured from the holes 48a and 48b located at positions far separated from the vanes 34.

Specifically, the air which has been discharged from the discharge holes 33a and 33b and used for the pressure-fed fluid bearing flows through the discharge passages 46a and 46b and is then discharged into the flow passage 49 at positions far separated from the vanes 34. As a result, the disadvantage inherent in the known turbine meter of the type where the air is discharged near the vanes 34, namely the disadvantage that the discharged air forms disc-shaped curtains along the front and rear edges of the vanes thereby obstructing flow of fluid being measured, does not arise. Therefore, the accuracy of measurement is not impaired by the air for the bearing so that measurement can be made with satisfactory accuracy even in the low flow rate range.

Figure 3:
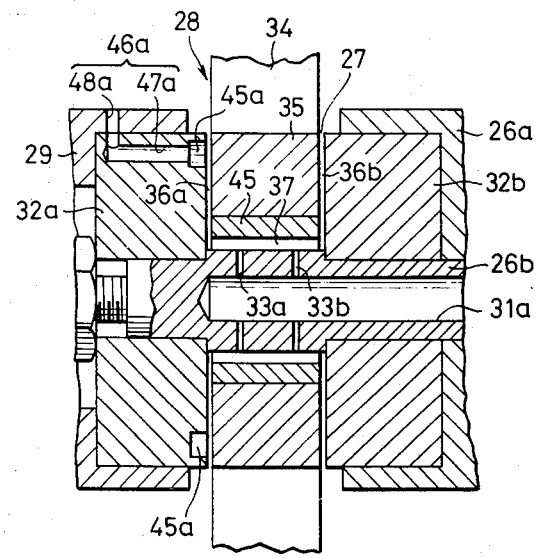
FIG. 3 through 6 are side views in longitudinal section respectively showing second through fifth embodiments of the pressure-fed fluid bearing applicable to the turbine meter of the present invention.

FIG. 3 shows a second embodiment of the pressure-fed fluid bearing which can be applied to the turbine meter of the present invention. Parts in FIG. 3 which are the same as the corresponding parts in FIG. 2 are designated by like reference numerals but will not be described in detail again.

In the pressure-fed fluid bearing of this embodiment, the downstream side discharge passage 46b provided in the above embodiment is omitted, so that only the air discharged into the gap 36a is discharged into the flow passage 49 through the discharge passage 46a. The air discharged from the discharge gap 36b tends to flow along the rear edge part of the vanes 34. The fluid being measured passes between the vanes 34 and thereafter meets with the above described flow of discharged air.

Accordingly, the fluid to be measured is little affected by the air discharged from the bearing so that the omission of the discharge passage 46b causes no drop in the accuracy of measurement.

Figure 4:
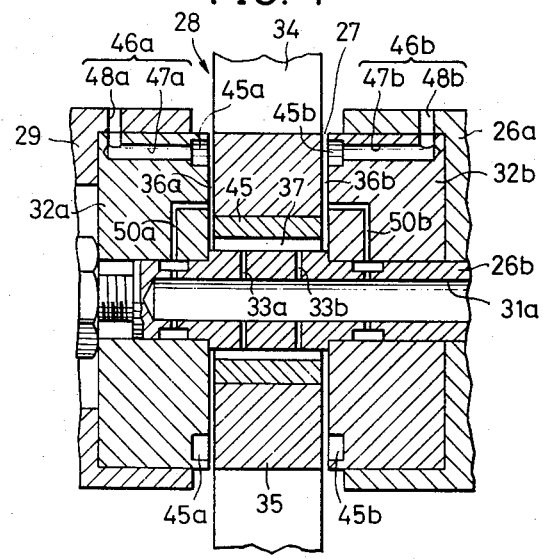

FIG. 4 shows a third embodiment of the pressure-fed fluid bearing which can be integrated into the turbine meter of the present invention. In FIG. 4, those parts which are the same as corresponding parts in FIG. 2 are designated by like reference numerals and description of these parts will be omitted.

In the pressure-fed fluid bearing of this embodiment, the thrust bearings 32a and 32b are respectively provided with discharge holes 50a and 50b formed therein so as to communicate with the gas passage 31a inside the axle part 26b and the discharge gaps 36a and 36b. From the discharge holes 50a and 50b, air to be served for the thrust bearing is ejected against the hub 35 of vane wheel 28 in the axial direction thereof.

The air discharged through the discharged passages 50a and 50b causes the vane wheel 28 to rotate in a state wherein its hub 35 is free from contact with both thrust bearings 32a and 32b, that is, in an "axially floating state". As a result, the accuracy of the turbine flowmeter in the low flow rate range can be further improved.

Figure 5:
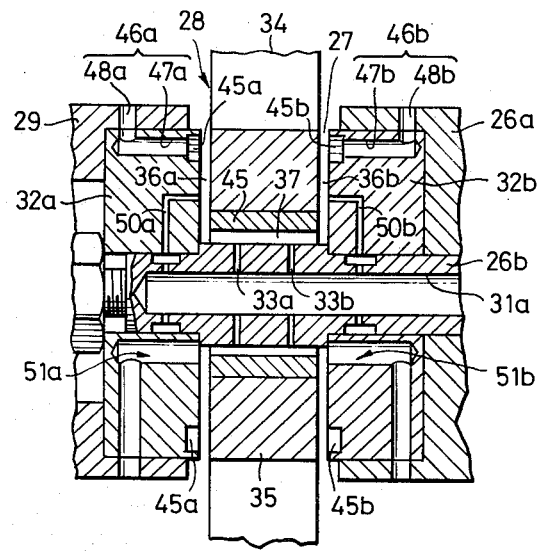

FIG. 5 shows a fourth embodiment of the pressure-fed fluid bearing which can be integrated into the turbine meter of the present invention. In FIG. 5., those parts which are the same as corresponding parts in FIG. 2 are designated by like reference numerals and description of these parts will be omitted.

In addition to the discharge passages 46a and 46b, the pressure-fed fluid bearing of this embodiment further has discharge passages 51a and 51b formed in the thrust bearings 32a and 32b at the inner peripheral part. This arrangement permits the air to be discharged more effectively from positions separated from the vane wheel 28, thus making it possible to further improve the above described effect.

The openings at one end of the discharge passages 51a and 51b are located to confront the cylindrical gap 37. Accordingly, the discharge passages 51a and 51b serve to efficiently discharge air flowing out from the cylindrical gap 37.

Figure 6:
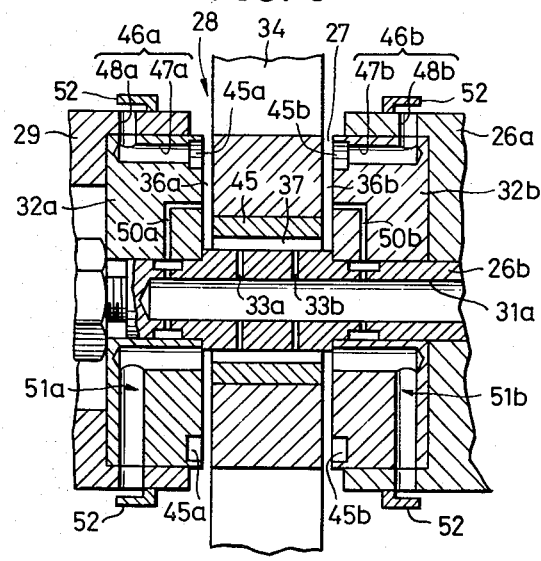

FIG. 6 shows a fifth embodiment of the pressure-fed fluid bearing which can be integrated into the turbine meter of the present invention. In FIG. 6, those parts which are the same as corresponding parts in FIG. 2 are designated by like reference numerals and description of these parts will be omitted.

In this pressure-fed fluid bearing of this embodiment, deflection plates 52 are fitted around the cones 29 and 26a so as to confront the openings of the discharge passages 46a and 51a and the openings of the discharge passages 46b and 51b. The deflection plates 52 operate to deflect the bearing air discharged from the discharge passages 46a, 46b, 51a and 51b away from the vane wheel 28. Moreover, the air thus deflected by the deflection plates 52 tend to flow along the surface of the nose cone 29 and the rear cone 26a. Accordingly, the detrimental effect of the bearing air on the fluid to be measured and to be passed through the vane wheel 34 can be minimized in a more satisfactory manner.

The deflection plates 52 may also be applied to the first through fourth embodiments of the pressure-fed fluid bearing.

In the embodiments illustrated in FIGS. 4 through 6, the discharge passages need not necessarily be provided at both the upstream side and the downstream side of the vane wheel 28. A discharge passage at only the upstream side is sufficient.

Moreover, the embodiments of the pressure-fed fluid bearings shown in FIGS. 2 through 4 may be modified by omitting the discharge passages 46a and 46b and providing only the discharge passages 51a and 51b indicated in FIGS. 5 and 6.

Further, this invention is not limited to these embodiments but various variations and modifications may be made without departing from the scope of the invention.

What is claimed is:

1. A turbine meter comprising: an axle member supported by a support member within a conduit through which a fluid to be measured is passed and having a small-diameter axle part and an annular recess formed around said small diameter axle part between a pair of opposed faces; a longitudinal flow passage formed in said axle member; a plurality of discharge holes formed in said axle member to communicatively connect the annular recess and the flow passage, said discharge holes comprising a first discharge hole formed in said small-diameter part, and a second discharge hole having one end thereof open into said passage and the other end thereof open into one of said opposed faces; a supply pipe inserted into said conduit through the wall thereof, functioning to supply a pressurized fluid from a pressurized fluid source disposed outside of said conduit to said flow passage in said axle member; a vane wheel comprising, a hub disposed around said axle member and within said annular recess with minute gaps therebetween, being adapted to rotate in a substantially non-contacting state relative to said small-diameter axle part, a plurality of vanes implantedly fixed at their respective root parts to said hub, said vane wheel being rotated by a portion of said fluid to be measured and flowing through said conduit; and at least one discharge passage opening at one end thereof at one of said pair of opposed faces for communication with said annular recess and at the other end thereof, into said conduit through which said fluid to be measured is passed at a position separate from said vanes of said vane wheel, one end of at least one discharge passage opening in the inner periphery of said opposed faces, and the pressurized fluid which has been discharged from said discharge holes into said annular recess being discharged by way of said discharge passage to said conduit through which said fluid to be measured is passed at a position separated from said vanes.

2. A turbine meter as claimed in claim 1, which further comprises: an annular groove formed in at least one face among said pair of opposed faces of said axle member, one end of said discharge passage opening into a part of said annular groove.

3. A turbine meter as claimed in claim 2, wherein: said annular groove is provided near the outer periphery of said opposed faces.

4. A turbine meter comprising: an axle member supported by a support member within a conduit through which a fluid to be measured is passed and having a small-diameter axle part and an annular recess formed around said small diameter axle part between a pair of opposed faces; a longitudinal flow passage formed in said axle member; a plurality of discharge holes formed in said axle member to communicatively connect the annular recess and the flow passage; a supply pipe inserted into said conduit through the wall thereof, functioning to supply a pressurized fluid from a pressurized fluid source disposed outside of said conduit to said flow passage in said axle member; a vane wheel comprising a hub disposed around said axle member and within said annular recess with minute gaps therebetween, being adapted to rotate in a substantially non-contacting state relative to said small-diameter axle part, a plurality of vanes implantedly fixed at their respective root parts to said hub, said vane wheel being rotated by a portion of said fluid to be measured and flowing through said conduit; a least one first discharge passage having one end open near the outer periphery of one of said opposed faces and the other end open into said conduit at a position separated from said vanes; and at least one second discharge passage having one end open near the inner periphery of one of said opposed faces and the other end open into said conduit at a position separate from said vanes, the pressurized fluid which has been discharged from said discharge holes into said annular recess being discharged by way of said discharge passage to said conduit through which said fluid to be measured is passed at a position separated from said vanes.

5. A turbine meter as claimed in claim 4, wherein: at least one flow deflection member disposed in the vicinity of an opening at the other end of at least one of said first and second discharge passages, for deflecting the pressurized fluid discharged from the opening away from said vanes.

* * * * *